US008078850B2

(12) United States Patent
Kuesel et al.

(10) Patent No.: US 8,078,850 B2
(45) Date of Patent: Dec. 13, 2011

(54) BRANCH PREDICTION TECHNIQUE USING INSTRUCTION FOR RESETTING RESULT TABLE POINTER

(75) Inventors: Jamie R. Kuesel, Rochester, MN (US); Mark G. Kupferschmidt, Afton, MN (US); Eric O. Mejdrich, Rochester, MN (US); Paul E. Schardt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 12/108,846

(22) Filed: Apr. 24, 2008

(65) Prior Publication Data

US 2009/0271597 A1    Oct. 29, 2009

(51) Int. Cl.
G06F 7/38 (2006.01)
G06F 9/00 (2006.01)
G06F 9/44 (2006.01)
G06F 15/00 (2006.01)

(52) U.S. Cl. ...................................... 712/239; 712/240
(58) Field of Classification Search .................. 712/239
See application file for complete search history.

(56) References Cited

U.S. PATENT DOCUMENTS

| 4,813,037 A | 3/1989 | Debuysscher et al. |
| 4,951,195 A | 8/1990 | Fogg et al. |
| 5,167,023 A | 11/1992 | De Nicolas et al. |
| 5,301,302 A | 4/1994 | Blackard et al. |
| 5,590,308 A | 12/1996 | Shih |
| 5,761,516 A | 6/1998 | Rostoker et al. |
| 5,870,479 A | 2/1999 | Feiken et al. |
| 5,884,060 A | 3/1999 | Vegesna et al. |
| 5,974,498 A | 10/1999 | Hopkins |
| 6,047,122 A | 4/2000 | Spiller |
| 6,049,866 A | 4/2000 | Earl |
| 6,085,315 A | 7/2000 | Fleck et al. |
| 6,101,599 A | 8/2000 | Wright et al. |
| 6,145,072 A | 11/2000 | Shams et al. |
| 6,151,668 A | 11/2000 | Pechanek et al. |
| 6,164,841 A | 12/2000 | Mattson et al. |
| 6,292,888 B1 | 9/2001 | Nemirovsky et al. |
| 6,446,171 B1 | 9/2002 | Henriksen |
| 6,519,605 B1 | 2/2003 | Gilgen et al. |
| 6,567,895 B2 | 5/2003 | Scales |
| 6,625,662 B1 | 9/2003 | Satoh et al. |

(Continued)

FOREIGN PATENT DOCUMENTS

CN    1599471    3/2005

OTHER PUBLICATIONS

Office Action Dated Jan. 29, 2010 in U.S. Appl. No. 11/945,396.

(Continued)

*Primary Examiner* — Corey S Faherty
(74) *Attorney, Agent, or Firm* — Biggers & Ohanian, LLP

(57) ABSTRACT

Methods, apparatus, and products for branch prediction in a computer processor are disclosed that include: recording for a sequence of occurrences of a branch, in an algorithm in which the branch occurs more than once, each result of the branch, including maintaining a pointer to a location of a most recently recorded result; resetting the pointer to a location of the first recorded result upon completion of the algorithm; and predicting subsequent results of the branch, in subsequent occurrences of the branch, in dependence upon the recorded results.

15 Claims, 6 Drawing Sheets

U.S. PATENT DOCUMENTS

| | | | |
|---|---|---|---|
| 6,668,308 | B2 | 12/2003 | Barroso et al. |
| 6,675,284 | B1 | 1/2004 | Warren |
| 6,725,317 | B1 | 4/2004 | Bouchier et al. |
| 6,823,429 | B1 | 11/2004 | Olnowich |
| 6,832,184 | B1 | 12/2004 | Bleier et al. |
| 6,891,828 | B2 | 5/2005 | Ngai |
| 6,915,402 | B2 | 7/2005 | Wilson et al. |
| 6,950,438 | B1 | 9/2005 | Owen et al. |
| 6,973,032 | B1 | 12/2005 | Casley et al. |
| 6,988,149 | B2 | 1/2006 | Odenwald |
| 7,010,580 | B1 | 3/2006 | Fu et al. |
| 7,072,996 | B2 | 7/2006 | Adusumilli et al. |
| 7,162,560 | B2 | 1/2007 | Taylor et al. |
| 7,376,789 | B2 | 5/2008 | Halleck et al. |
| 7,394,288 | B1 | 7/2008 | Agarwal |
| 7,398,374 | B2 | 7/2008 | DeLano |
| 7,464,197 | B2 | 12/2008 | Ganapathy et al. |
| 7,493,474 | B1 | 2/2009 | Pechanek et al. |
| 7,500,060 | B1 | 3/2009 | Anderson et al. |
| 7,502,378 | B2 | 3/2009 | Lajolo et al. |
| 7,521,961 | B1 | 4/2009 | Anderson |
| 7,533,154 | B1 | 5/2009 | Chen et al. |
| 7,546,444 | B1 | 6/2009 | Wolrich et al. |
| 7,568,064 | B2 | 7/2009 | Rablewski et al. |
| 7,590,774 | B2 | 9/2009 | Johns et al. |
| 7,664,108 | B2 | 2/2010 | Bahattab |
| 7,689,738 | B1 | 3/2010 | Williams et al. |
| 2002/0099833 | A1 | 7/2002 | Steely et al. |
| 2002/0178337 | A1 | 11/2002 | Wilson et al. |
| 2003/0065890 | A1 | 4/2003 | Lyon |
| 2004/0083341 | A1 | 4/2004 | Robinson et al. |
| 2004/0088487 | A1 | 5/2004 | Barroso et al. |
| 2004/0151197 | A1 | 8/2004 | Hui |
| 2004/0250046 | A1 | 12/2004 | Gonzalez et al. |
| 2004/0260906 | A1 | 12/2004 | Landin et al. |
| 2005/0086435 | A1 | 4/2005 | Todoroki |
| 2005/0166205 | A1 | 7/2005 | Oskin et al. |
| 2005/0198442 | A1 | 9/2005 | Mandler |
| 2005/0203988 | A1 | 9/2005 | Nolle et al. |
| 2005/0238035 | A1 | 10/2005 | Riley |
| 2006/0209846 | A1 | 9/2006 | Clermidy et al. |
| 2006/0242393 | A1* | 10/2006 | Park et al. ............... 712/240 |
| 2007/0055826 | A1 | 3/2007 | Morton et al. |
| 2007/0074191 | A1 | 3/2007 | Geisinger |
| 2007/0076739 | A1 | 4/2007 | Manjeshwar et al. |
| 2007/0271557 | A1 | 11/2007 | Geisinger |
| 2007/0283324 | A1 | 12/2007 | Geisinger |
| 2008/0028401 | A1 | 1/2008 | Geisinger |
| 2008/0134191 | A1 | 6/2008 | Warrier et al. |
| 2008/0186998 | A1 | 8/2008 | Rijpkema |
| 2008/0216073 | A1 | 9/2008 | Yates et al. |
| 2009/0083263 | A1 | 3/2009 | Felch et al. |
| 2009/0282222 | A1 | 11/2009 | Hoover et al. |

OTHER PUBLICATIONS

Final Office Action Dated Jan. 15, 2010 in U.S. Appl. No. 12/031,733.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
INTEL, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Virtanen, et al. "NoC Interface for a Protocol Processor". University of Turku.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, May 9, 2008, Hoover, et al.
U.S. Appl. No. 12/121,222, May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Steve Furber, Future Trends in SOC Interconnect, Aug. 2000.
Bolotin, et al., The Power of Priority:NoC based Distributed Cache Coherency, May 21, 2007, IEEE, pp. 117-126.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Issenin et al.; (Date Reuse Driven Memory and network-on-Chip Co-Synthesis); NSF; pp. 1-7.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Al-Hashimi; ("System-on-Chip- Net Generation Electronics", "Asynchronous on-chip networks"2006); Chapter 18 p. 1-32.
Final Office Action U.S. Appl. No. 11/926,212, filed Aug. 23, 2010.
Final Office Action U.S. Appl. No. 11/955,553, filed Sep. 13, 2010.
Final Office Action U.S. Appl. No. 12/031,733, filed Aug. 19, 2010.
Notice of Allowance U.S. Appl. No. 12/118,298, filed Aug. 18, 2010.
Office Action U.S. Appl. No. 11/972,753, filed Oct. 4, 2010.
Office Action U.S. Appl. No. 12/015,975, filed Jul. 22, 2010.
Office Action U.S. Appl. No. 11/937,579, filed Sep. 16, 2010.
Office Action U.S. Appl. No. 12/118,059, filed Sep. 1, 2010.
Office Action U.S. Appl. No. 12/121,168, filed Oct. 5, 2010.
Nikolay Kvaldjiev et al., A Virtual Channel Network-on-chip for GT and BE traffic, Apr. 2006, IEEE Emerging VLSI Technologies and Architectures.
Office Action U.S. Appl. No. 11/926,212, filed Dec. 7, 2010.
Office Action U.S. Appl. No. 11/945,396, filed Dec. 9, 2010.
Notice of Allowance U.S. Appl. No. 11/955,553, filed Nov. 22, 2010.
Notice of Allowance U.S. Appl. No. 12/031,733, filed Nov. 16, 2010.
Office Action U.S. Appl. No. 12/118,017, filed Dec. 8, 2010.
Office Action U.S. Appl. No. 12/118,272, filed Dec. 2, 2010.

Office Action U.S. Appl. No. 12/108,846, filed Dec. 2, 2010.
Final Office Action U.S. Appl. No. 12/117,875, filed Nov. 10, 2010.
Office Action U.S. Appl. No. 12/117,906, filed May 9, 2008.
Office Action U.S. Appl. No. 12/060,559, filed Nov. 3, 2010.
Advisory Action U.S. Appl. No. 11/926,212, filed Nov. 2, 2010.
Master Dissertation, University of Electronic Science and Technology of China, pp. 0-35 and pp. 36-81 (includes English abstract).
1994-2010 China Academic Journal Electronic Publishing House, pp. 0-30 and pp. 31-66 (includes English abstract).
Final Office Action U.S. Appl. No. 11/972,753, filed Feb. 18, 2011.
Final Office Action U.S. Appl. No. 12/015,975, filed Jan. 7, 2011.
Final Office Action U.S. Appl. No. 12/108,846, filed Feb. 17, 2011.
Final Office Action U.S. Appl. No. 12/113,286, filed Feb. 18, 2011.
Final Office Action U.S. Appl. No. 12/118,059, filed Feb. 17, 2011.
Office Action U.S. Appl. No. 11/945,396, filed Mar. 3, 2011.
Final Office Action U.S. Appl. No. 12/118,017, filed Mar. 28, 2011.
Final Office Action U.S. Appl. No. 11/937,579, filed Feb. 23, 2011.
Office Action U.S. Appl. No. 12/108,770, filed Apr. 12, 2011.
Final Office Action U.S. Appl. No. 12/117,906, filed Mar. 28, 2011.
Office Action U.S. Appl. No. 12/060,559, filed Apr. 1, 2011.

* cited by examiner

BRANCH PREDICTION TECHNIQUE USING INSTRUCTION FOR RESETTING RESULT TABLE POINTER

BACKGROUND OF THE INVENTION

1. Field of the Invention

The field of the invention is data processing, or, more specifically methods, apparatus, and products for branch prediction in a computer processor.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today typically include computer processors that execute computer program instructions of an algorithm. Some algorithms may include one or more branches. A branch is a point in a computer program where the flow of control is altered. A branch may or may not be taken and the target of a taken branch may vary between subsequent occurrences of the branch. Predicting branch results may be useful to increase the rate of executing computer program instructions of an algorithm. Typical prior art branch prediction techniques, however, often produce inaccurate predictions of results of a branch which occurs multiple times during the execution of a single algorithm.

SUMMARY OF THE INVENTION

Methods, apparatus, and products for branch prediction in a computer processor are disclosed that include: recording for a sequence of occurrences of a branch, in an algorithm in which the branch occurs more than once, each result of the branch, including maintaining a pointer to a location of a most recently recorded result; resetting the pointer to a location of the first recorded result upon completion of the algorithm; and predicting subsequent results of the branch, in subsequent occurrences of the branch, in dependence upon the recorded results.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
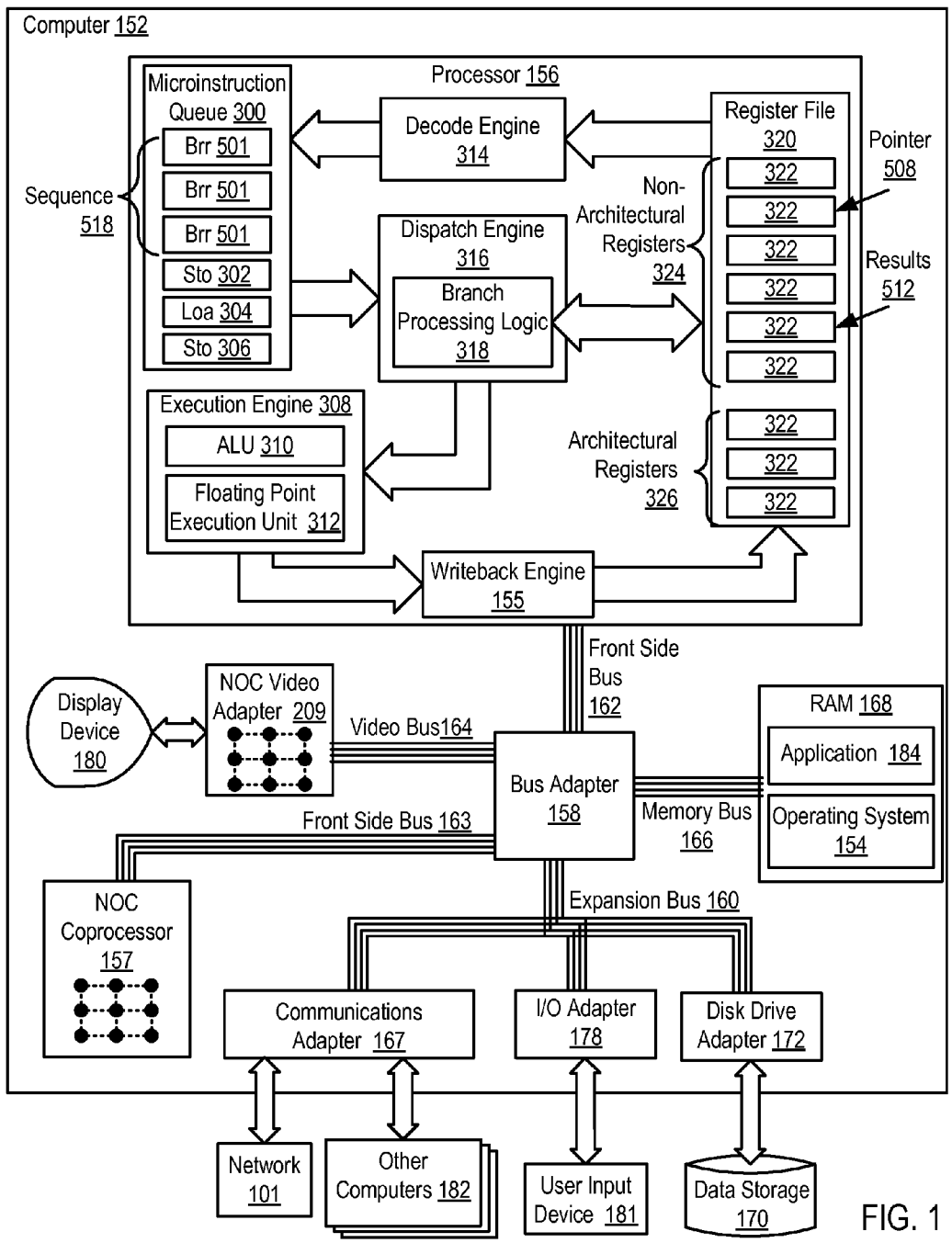
FIG. 1 sets forth a block diagram of automated computing machinery comprising an exemplary computer useful in branch prediction in a computer processor according to embodiments of the present invention.

Exemplary methods, apparatus, and products for branch prediction in a computer processor in accordance with the present invention are described with reference to the accompanying drawings, beginning with FIG. 1. FIG. 1 sets forth a block diagram of automated computing machinery comprising an exemplary computer (152) useful in branch prediction in a computer processor according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. The application program (184) in the example of FIG. 1 includes an algorithm (516) which, in turn, includes a sequence (518) of occurrences of a branch (501). Also stored in RAM (168) is an operating system (154). Operating systems useful for branch prediction in a computer processor according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The processor (156) in the example computer (152) of FIG. 1 is configured to be capable of branch prediction in accordance with embodiments of the present invention. In addition to processor (156) in the example computer (152) of FIG. 1, the NOC coprocessor (157) as well as any processor in an IP block of the NOC video adapter (209) may also be configured to be capable of branch prediction according to embodiments of the present invention. A branch (501) is a point in a computer program where the flow of control is altered. The term branch is usually used when referring to a program written in machine code or assembly language; in a high-level programming language, branches usually take the form of conditional statements, subroutine calls, or GOTO statements. An instruction that causes a branch is called a branch instruction. Examples of branch instructions include a jump instruction or branch on zero instruction. A branch may be taken or not taken: if a branch is not taken, the flow of control is unchanged and the next instruction to be executed is the instruction immediately following the current instruction in memory; if taken, the next instruction to be executed is an instruction at some other place in memory, a target of a branch. There are two typical forms of branch instructions: a conditional branch that can be either taken or not taken, depending on a condition such as a CPU flag, and an unconditional branch which is always taken.

The exemplary processor (156) of FIG. 1 includes a register file (320) made up of all the registers (322) of the processor. The register file (320) is an array of processor registers typically implemented with fast static memory devices. The registers include registers (324) that are accessible only by the execution units as well as 'architectural registers' (326). The instruction set architecture of processor (156) defines a set of registers, called 'architectural registers,' that are used to stage data between memory and the execution units in the processor. The architectural registers are the registers that are accessible directly by user-level computer program instructions. In simpler processors, these architectural registers correspond one-for-one to the entries in a physical register file within the processor. More complicated processors, such as the processor (156) illustrated here, use register renaming, so that the mapping of which physical entry stores a particular architectural register changes dynamically during execution.

The processor (156) also includes a decode engine (314), a dispatch engine (316), an execution engine (308), and a writeback engine (155). Each of these engines is a network of static and dynamic logic within the processor (156) that carries out particular functions for pipelining program instructions internally within the processor. The decode engine (314) retrieves machine code instructions from registers in the register set and decodes the machine instructions into microinstructions. The dispatch engine (316) dispatches microinstructions to execution units in the execution engine. Execution units in the execution engine (308) execute microinstructions. And the writeback engine (155) writes the results of execution back into the correct registers in the register file (320).

The dispatch engine (316) in the exemplary processor (156) of FIG. 1 includes branch processing logic (318) which is a network of static and dynamic logic for branch prediction in the processor (156). The processor (156) may use the branch processing logic (318) of the dispatch engine (316) to carry out branch prediction in accordance with embodiments of the present invention by recording, by the branch processing logic (318), for a sequence (518) of occurrences of a branch (501), in an algorithm in which the branch (501) occurs more than once, each result (512) of the branch (501). The branch processing logic (318) may carry out recording each result of the branch by recording in a register (322) of the non-architectural registers (324), whether a branch was taken or not taken, or an address for a target of the branch. As an alternative to recording results of a branch in a register (322), the branch processing logic (155) may also record results of a branch in high-speed local memory of the processor (156). In the example of FIG. 1, recording each result of the branch (501) includes maintaining a pointer (508) to a location of a most recently recorded result. The branch processing logic (155) may maintain a pointer (508) to a location of a most recently recorded result, by storing in a register (322) a memory location or identity of a register in which the most recently recorded result of the branch is stored.

Branch prediction in accordance with embodiments of the present invention also includes resetting the pointer (508) to a location of the first recorded result upon completion of the algorithm (516) and predicting subsequent results of the branch (501), in subsequent occurrences of the branch (501), in dependence upon the recorded results (512). Resetting the pointer (508) to a location of the first recorded result upon completion of the algorithm (516) may be carried out by setting by the branch processing logic (318) the value of the pointer (508) to the memory address or to the identity of a register in which the first recorded result is stored.

Predicting subsequent results of the branch (501), in subsequent occurrences of the branch (501), in dependence upon the recorded results (512) may be carried out by fetching and executing a branch instruction upon an occurrence of a branch, before the branch is executed by the dispatch engine, when the recorded result (512) corresponding to that occurrence of the branch in the algorithm indicates that the branch was taken, or by fetching and executing a target instruction upon an occurrence of a branch, before the branch is executed when the recorded result (512) corresponding to that occurrence of the branch in the algorithm identifies a target address of the branch instruction, and so on as will occur to those of skill in the art.

Branch prediction in the example of FIG. 1 may occur transparently with respect to user-level applications by using the non-architectural registers (324) of the register file (320) for recording results (512) of a branch and maintaining a pointer (508). That is, a user-level application is unaware of the location of the results of a branch.

The processor (156) also includes a decode engine (314) that reads a user-level computer program instruction and decodes that instruction into one or more microinstructions for insertion into a microinstruction queue (300). Just as a single high level language instruction is compiled and assembled to a series of machine instructions (load, store, shift, etc), each machine instruction is in turn implemented by a series of microinstructions. Such a series of microinstructions is sometimes called a 'microprogram' or 'microcode.' The microinstructions are sometimes referred to as 'micro-operations,' 'micro-ops,' or 'μops'—although in this specification, a microinstruction is usually referred to as a 'microinstruction.'

Microprograms are carefully designed and optimized for the fastest possible execution, since a slow microprogram would yield a slow machine instruction which would in turn cause all programs using that instruction to be slow. Microinstructions, for example, may specify such fundamental operations as the following:

Connect Register 1 to the "A" side of the ALU
Connect Register 7 to the "B" side of the ALU
Set the ALU to perform two's-complement addition
Set the ALU's carry input to zero
Store the result value in Register 8
Update the "condition codes" with the ALU status flags ("Negative", "Zero", "Overflow", and "Carry")
Microjump to MicroPC nnn for the next microinstruction For a further example: A typical assembly language instruction to add two numbers, such as, for example, ADD A, B, C, may add the values found in memory locations A and B and then put the result in memory location C. In processor (156), the decode engine (314) may break this user-level instruction into a series of microinstructions similar to:

LOAD A, Reg1
LOAD B, Reg2
ADD Reg1, Reg2, Reg3
STORE Reg3, C

It is these microinstructions that are then placed in the microinstruction queue (300) to be dispatched to execution units.

Processor (156) also includes a dispatch engine (316) that carries out the work of dispatching individual microinstructions from the microinstruction queue to execution units. The processor (156) includes an execution engine (308) that in turn includes several execution units, an ALU (310) and a floating point execution unit (312). The microinstruction queue in this example includes a first store microinstruction (306), a corresponding load microinstruction (304), and a second store microinstruction (302). The load instruction (304) is said to correspond to the first store instruction (306) because the dispatch engine (316) dispatches both the first store instruction (306) and its corresponding load instruction (304) into the execution engine (308) at the same time, on the same clock cycle. The dispatch engine can do so because the execution engine support two pipelines of execution, so that two microinstruction can move through the execution portion of the pipelines at exactly the same time.

The example computer (152) also includes two example network on chips ('NOCs'): a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOC video adapter and the NOC coprocessor are optimized for programs that use parallel processing and also require fast random access to shared memory. The details of the NOC structure and operation are discussed below with reference to FIGS. 2-4.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for branch prediction in a computer processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for branch prediction in a computer processor according to embodiments of the present invention include modems for wired dial-up communications, Ethernet (IEEE 802.3) adapters for wired data communications network communications, and 802.11 adapters for wireless data communications network communications.

Figure 2:
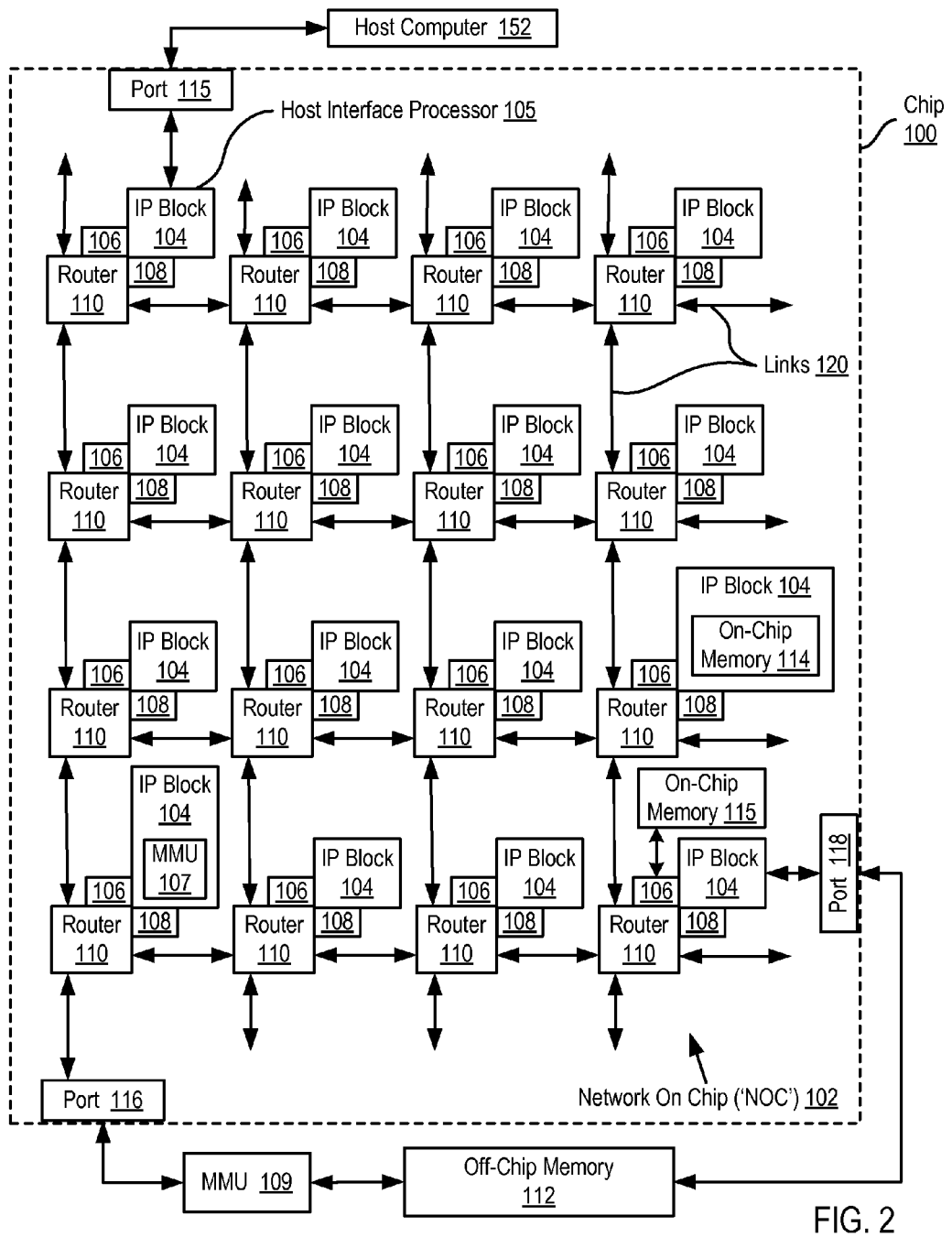
FIG. 2 sets forth a functional block diagram of an example apparatus for implementing branch prediction in a computer processor in accordance with embodiments of the present invention.

For further explanation, FIG. 2 sets forth a functional block diagram of an example apparatus for implementing branch prediction in a computer processor in accordance with embodiments of the present invention. Such an apparatus useful for implementing branch prediction in a compute processor may be a NOC (102). The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Branch prediction in a computer processor in accordance with embodiments of the present invention may be implemented on a NOC (102). Branch prediction may be carried out, for example, in a computer processor in any of the IP blocks (104) in the NOC (102) of FIG. 2 in accordance with embodiments of the present invention.

Such processors in IP blocks may carry out branch prediction according to embodiments of the present invention by recording for a sequence of occurrences of a branch, in an algorithm in which the branch occurs more than once, each result of the branch, including maintaining a pointer to a location of a most recently recorded result. Processors in IP blocks may also carry out branch prediction according to embodiments of the present invention by resetting the pointer to a location of the first recorded result upon completion of the algorithm. The processor, whether a processor implemented in an IP block (104) or a processor of a host computer (152) may then predict subsequent results of the branch, in subsequent occurrences of the branch, in dependence upon the recorded results.

Figure 3:
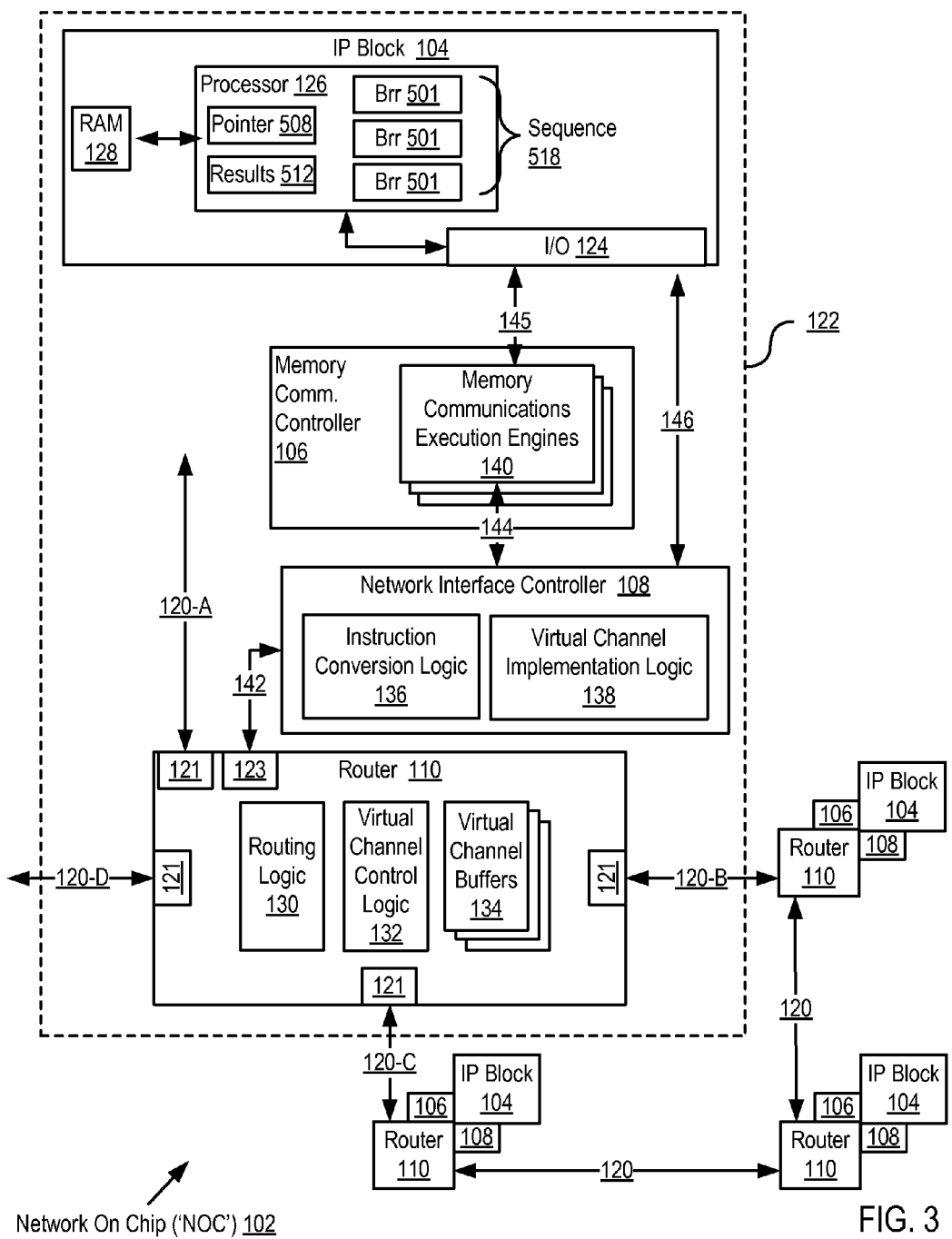
FIG. 3 sets forth a functional block diagram of a further example apparatus useful for branch prediction in a computer processor according to embodiments of the present invention.

For further explanation, FIG. 3 sets forth a functional block diagram of a further example apparatus useful for branch prediction in a computer processor according to embodiments of the present invention, a NOC. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

As mentioned above, branch prediction in a computer processor in accordance with embodiments of the present invention may be implemented with a NOC (102). In fact, branch prediction according to embodiments of the present invention may be implemented on a single IP block (104) of a NOC (102). Consider, for example, IP block (104) of the expanded set (122) which includes a computer processor (126) and RAM (128). The processor (126) in the example of FIG. 3 may be configured to record for a sequence (512) of occurrences of a branch (501), in an algorithm in which the branch (501) occurs more than once, each result of the branch, including maintaining a pointer (508) to a location of a most recently recorded result. The processor may store results of a branch in processor registers, architectural or non-architectural, or in local high-speed memory. The processor (126) may also be configured to reset the pointer to a location of the first recorded result upon completion of the algorithm and predict subsequent results of the branch, in subsequent occurrences of the branch, in dependence upon the recorded results.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers.

The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
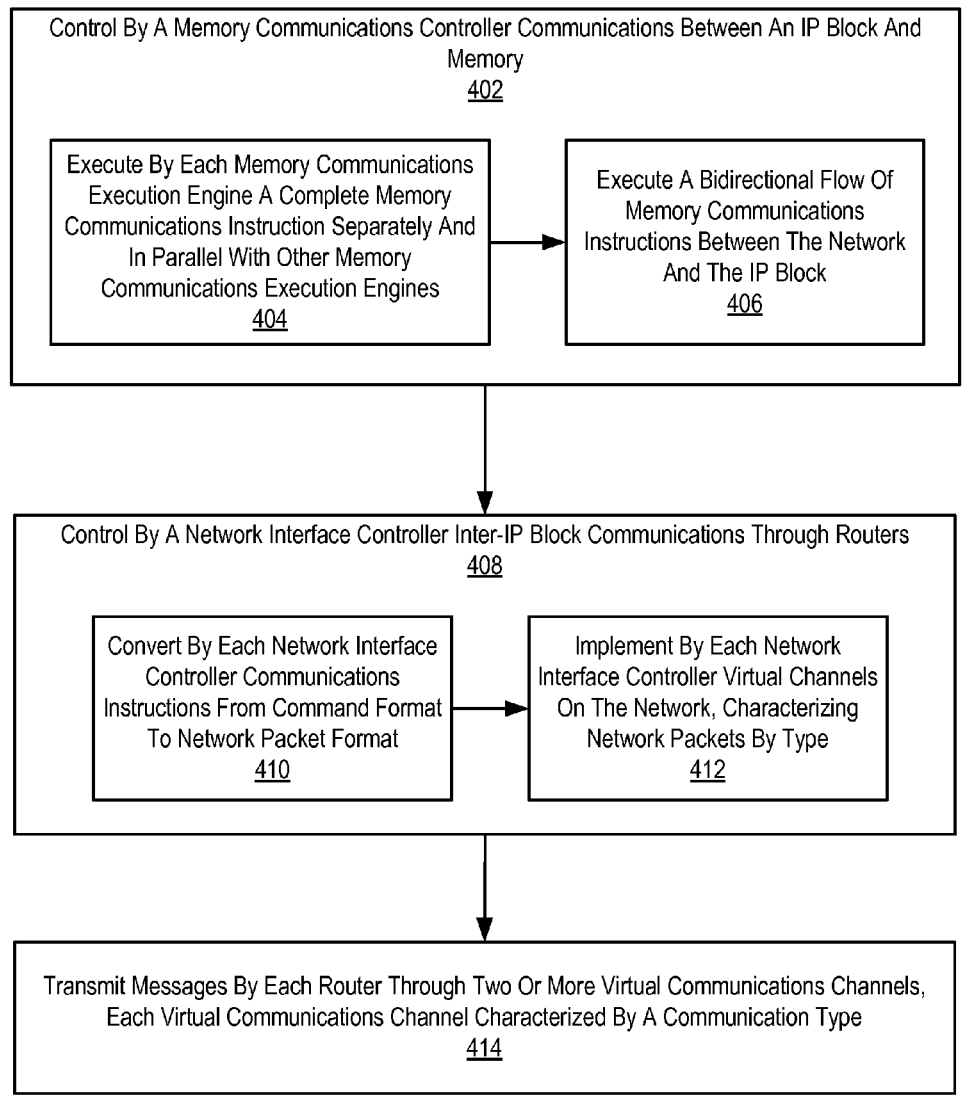
FIG. 4 sets forth a flow chart illustrating an exemplary method for data processing with a NOC.

As mentioned above, branch prediction in a computer processor in accordance with embodiments of the present invention may be implemented with an apparatus, such as a NOC. For further explanation, therefore, FIG. 4 sets forth a flow chart illustrating an exemplary method for data processing with such a NOC. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 5:
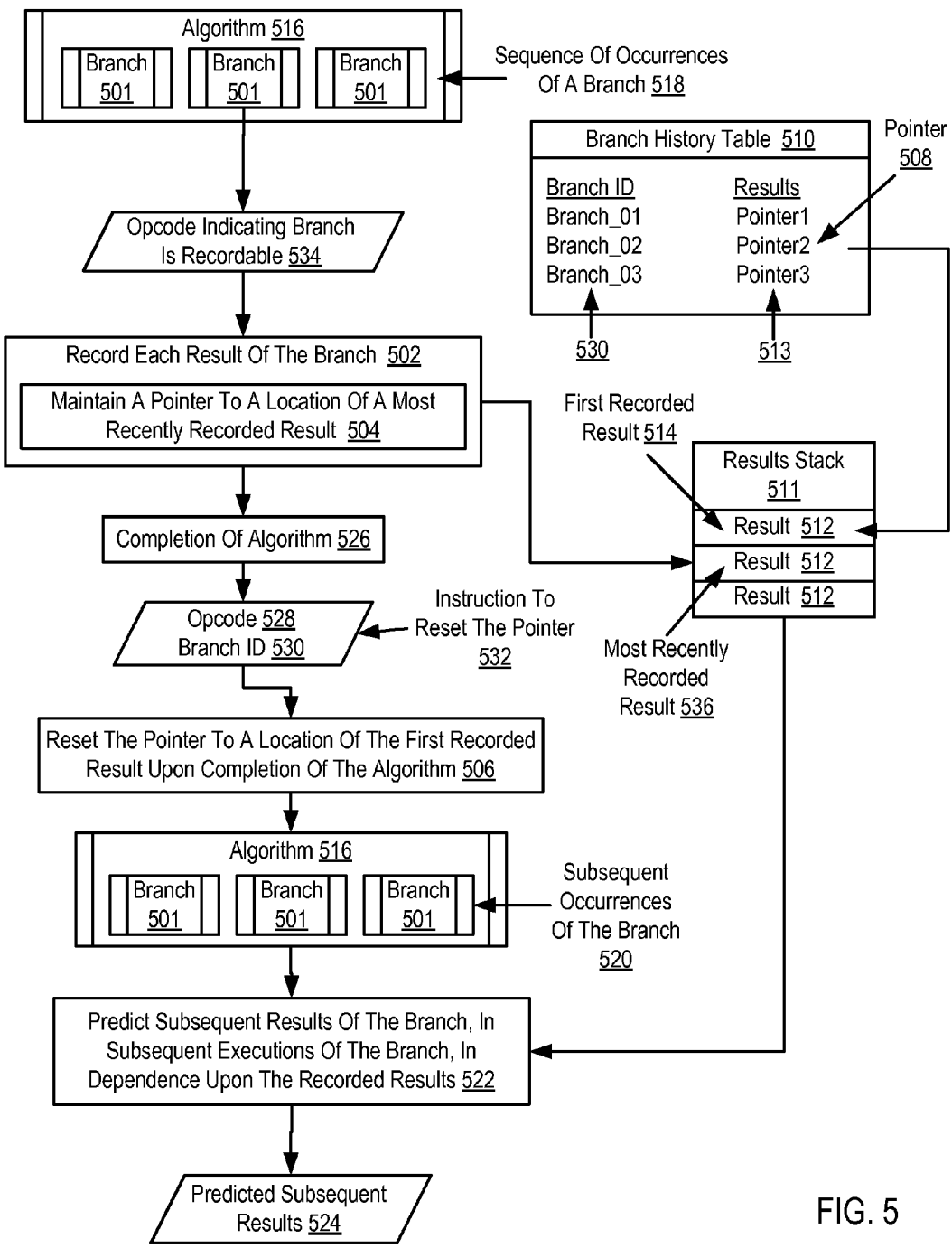
FIG. 5 sets forth a flow chart illustrating an exemplary method of branch prediction in a computer processor according to embodiments of the present invention.

For further explanation, FIG. 5 sets forth a flow chart illustrating an exemplary method of branch prediction in a computer processor according to embodiments of the present invention. Branch prediction in accordance with embodiments of the present invention has been described largely in this specification as being implemented with a NOC and in computer processors included in IP blocks of a NOC. Readers of skill in the art will recognize, however, that branch prediction in a computer processor in accordance with embodiments of the present may be implemented with a variety of hardware and software platforms in addition to the NOCs described herein and each such platform is well within the scope of the present invention.

As mentioned above, a branch (501) is a point in a computer program where the flow of control is altered. The term branch is usually used when referring to a program written in machine code or assembly language; in a high-level programming language, branches usually take the form of conditional statements, subroutine calls, or GOTO statements. An instruction that causes a branch, a branch instruction, can be taken or not taken: if a branch is not taken, the flow of control is unchanged and the next instruction to be executed is the instruction immediately following the current instruction in memory; if taken, the next instruction to be executed is an instruction at some other place in memory. There are two typical forms of branch instructions: a conditional branch that can be either taken or not taken, depending on a condition such as a CPU flag, and an unconditional branch which is always taken.

The method of FIG. 5 includes recording (502) for a sequence (518) of occurrences of a branch (501), in an algorithm (516) in which the branch (501) occurs more than once, each result (512) of the branch (501). In the method of FIG. 5, recording (502) each result (512) of the branch is carried out in response to an operation code ('opcode') (534) indicating that the branch (501) is recordable. An opcode, short for operation code, is a portion of a machine language instruction that specifies an operation to be performed. Examples of typical opcodes in assembly language include:

jmp, an opcode that specifies an unconditional jump;
jmz, an opcode that specifies a conditional jump that occurs if a value of particular register is zero;
jnz, an opcode that specifies a conditional jump that occurs if a value of particular register is not zero;
jnf, an opcode that specifies a conditional jump that occurs if a flag is set;
brn, an opcode that specifies an unconditional branch;
brz, an opcode that specifies a conditional branch that occurs if a value of a register is zero;
bnz, an opcode that specifies a conditional branch that occurs if a value of a register is not zero;
bnf, an opcode that specifies a conditional branch that occurs if a flag is set; and
others as will occur to those of skill in the art.

Examples of an assembly language opcode indicating that a branch (501) is a recordable in accordance with embodiments of the present invention may include 'brr' indicating that the branch is recordable, or 'jmr' indicating that a jump is recordable. Such an opcode (534) in accordance with embodiments of the present invention may include, for example, a string of binary bits where one or more bits represent that a particular branch is recordable for purposes of branch prediction in accordance with embodiments of the present invention.

Also in the method of FIG. 5, recording (502) each result of the branch (501) includes maintaining (504) a pointer (508) to a location of a most recently recorded result (536). A pointer is an element of computer memory that stores an address of another element of computer memory. Typically in apparatus that support the method of FIG. 5, the elements of computer memory used as pointers are registers in a computer processor or memory locations in high-speed memory located on the processor. From the point of view of a programming language, a pointer is a programming language data type whose value refers directly to another value stored elsewhere in the computer memory through the use of a memory address for the other value. Maintaining (504) a pointer (508) to a location of a most recently recorded result (536) may be carried out by incrementing the value of the pointer upon an occurrence of the branch (501) prior to recording a result for that occurrence of the branch so that the pointer points to the element of the results stack which contains the most recently recorded result.

The exemplary pointer (508) in the method of FIG. 5 is implemented as an entry in a branch history table (510). The branch history table (510) in the method of FIG. 5 is a data structure that represents branch results (513) for each branch in an algorithm (516). That is, each record in the branch history table represents a branch in an algorithm, and each record associates, through a pointer in a one-to-many fashion, a branch with an historical listing of the results of the branch, taken or not taken, for example. Although the branch history table (510) in the example of FIG. 5 is depicted as a table for ease of explanation, readers of skill in the art will immediately recognize that such a branch history table (510) may also be implemented as other data structures such as, for example, a linked list, an array, and so on.

The branch history table (510) of FIG. 5 includes associations of a branch with results of the branch. The exemplary branch history table of FIG. 5 specifically includes two columns, one column titled 'Branch ID,' representing identifications (530) of one or more branches and a second column titled 'Results,' representing the results (513) of each branch identified in the 'Branch ID' column. Three branches are identified in the 'Branch ID' column: Branch_01, Branch_02, and Branch_03. Branch identifications (530) in the method of FIG. 5 may include a memory address of a branch instruction, a hash of such a memory address, and so on as will occur to those of skill in the art. The 'Results' column (513) in the exemplary branch history table (510) in the method of FIG. 5 includes three pointers, Pointer1, Pointer2, and Pointer3. Each pointer is associated with a branch identification (530) in the 'Branch ID' column of the branch history table (510).

In the method of FIG. 5, recording (502) each result of the branch (501) may be carried out by storing in a data structure, upon each occurrence of a branch, an indication of whether the branch was taken or not taken. Such results (512) in the example of FIG. 5 are stored in a results stack (511). The exemplary results stack (511) in the example of FIG. 5 is a data structure, such as a table or an array, useful for storing results (512) of a particular branch (501). Such a data structure when filled represents historical results of each occurrence of the particular branch (501) throughout the algorithm (516). Upon an occurrence of the branch (501) in the example of FIG. 5, the result (512) of the branch is recorded in an entry of the results stack (512). Each result of subsequent occurrences of the branch is stored in a subsequent entry in the results stack (511).

Although a branch history table (510) is depicted in the example of FIG. 5 as representing branch results for each branch in the algorithm (516), readers of skill in the art will recognize that such a table is only one example of a data structure representing branch results for each branch in an algorithm. Another example of a data structure representing branch results for each branch in an algorithm may be a branch target buffer. Branch results in a branch target buffer identify the target of a branch, usually by a memory address or register identification, instead of instead of indicating whether a branch was taken or not taken. That is, each record in a branch target buffer represents a branch in an algorithm, and each record associates, through a pointer in a one-to-many fashion, a branch with an historical listing of the target addresses of the branch.

The method of FIG. 5 also includes resetting (506) the pointer (508) to a location of the first recorded result (514) upon completion (526) of the algorithm (516). Resetting (506) the pointer (508) to a location of the first recorded result (514) upon completion (526) of the algorithm (516) may be carried out by setting the value of the pointer to the memory address or to the identity of a register in which the first recorded result is stored. In the method of FIG. 5, resetting (506) the pointer may include resetting (506) the pointer (508) responsive to an opcode (528) representing an instruction (532) to reset the pointer (508) and providing as a parameter of the instruction (532) an identifier (530) of the branch (501). An identifier (530) of the branch (501) may include a memory address of the branch instruction, that is, the memory address of a computer program instruction representing the branch, a hash of such a memory address, or other identifiers as will occur to readers of skill in the art.

The method of FIG. 5 also includes predicting (522) subsequent results (524) of the branch (501), in subsequent occurrences (520) of the branch (501), in dependence upon the recorded results (512). That is, the recorded results (512) stored in the results stack (511) for the branch (501) may be used for predicting branch prediction when the algorithm (516) is subsequently executed and the branch (501) subsequently occurs.

Figure 6:
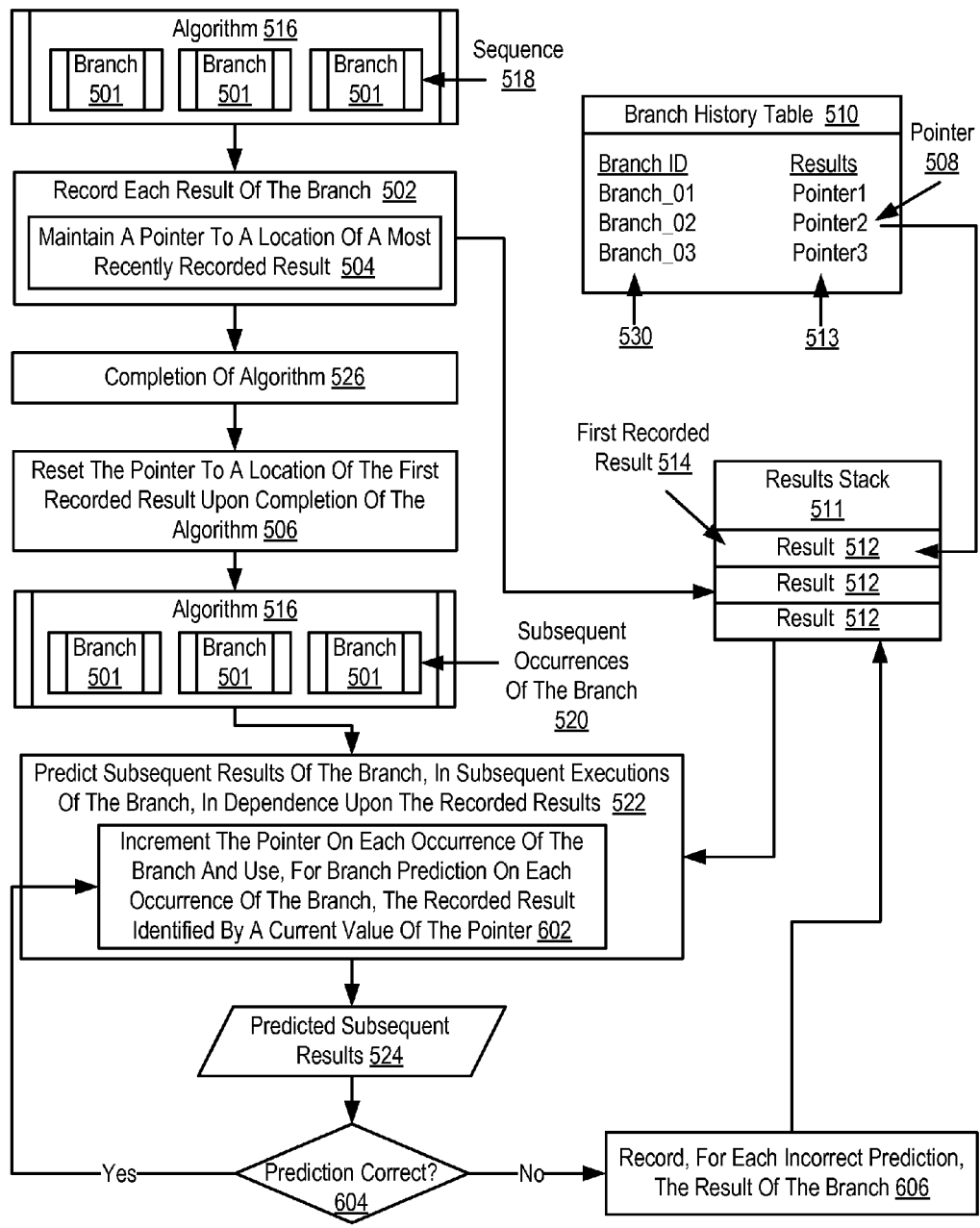
FIG. 6 sets forth a flow chart illustrating a further exemplary method of branch prediction in a computer processor according to embodiments of the present invention.

For further explanation, FIG. 6 sets forth a flow chart illustrating a further exemplary method of branch prediction in a computer processor according to embodiments of the present invention. The method of FIG. 6 is similar to the method of FIG. 5 including, as it does, recording (502) for a sequence (518) of occurrences of a branch (501), in an algorithm (516) in which the branch (501) occurs more than once, each result (512) of the branch (501), including maintaining (504) a pointer (508) to a location of a most recently recorded result (536); resetting (506) the pointer (508) to a location of the first recorded result (514) upon completion (526) of the algorithm (516); and predicting (522) subsequent results (524) of the branch (501), in subsequent occurrences (520) of the branch (501), in dependence upon the recorded results (512).

The method of FIG. 6 differs from the method of FIG. 5, however, in that in the method of FIG. 6, predicting (522) subsequent results (524) of the branch (501) is carried out by incrementing (602) the pointer (508) on each occurrence of the branch (501) and using, for branch prediction on each occurrence of the branch (501), the recorded result (512) identified by a current value of the pointer (508). Examples of using, for branch prediction on each occurrence of the branch (501), the recorded result (512) identified by a current value of the pointer (508) may include taking a branch upon occurrence of the branch if the recorded result identified by a current value of the pointer indicates the branch was previously taken, not taking a branch upon occurrence of the branch if the recorded result identified by a current value of the pointer indicates the branch was not previously taken, loading a target memory address of a branch instruction identified in the recorded result identified by a current value of the pointer, and so on as will occur to readers of skill in the art.

The method of FIG. 6 also includes determining (604) for each prediction (524) whether the prediction was correct. Determining (604) for each prediction (524) whether the prediction was correct may be carried out by comparing the actual result of the most recent occurrence of the branch (501) with the recorded result (512) of a previous occurrence of the branch (501). If the actual result of the most recent occurrence of the branch (501) matches the recorded result (512) of the previous occurrence of the branch, the prediction was correct. If the actual result of the most recent occurrence of the branch (501) does not match the recorded result (512) of the previous occurrence of the branch, the prediction was incorrect.

If the prediction (524) is determined to be correct, the method of FIG. 6 continues by incrementing (602) the pointer on each occurrence of the branch and using for branch prediction on each occurrence of the branch, the recorded result identified by a current value of the pointer. If the prediction (524) is determined to be incorrect, the method of FIG. 6 continues by recording (606), for each incorrect prediction, the result (512) of the branch (501). Recording (606), for each incorrect prediction, the result (512) of the branch (501) may be carried out by replacing in a results stack (511), the incorrect, previously recorded result (512) of the previous occurrence of the branch with the correct, actual result of the most recent occurrence of the branch.

Exemplary embodiments of the present invention are described largely in the context of a fully functional computer system for branch prediction in a computer processor. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of branch prediction in a computer processor, the method comprising:
   recording for a sequence of occurrences of a branch, in an algorithm in which the branch occurs more than once, each result of the branch, including maintaining a pointer to a location of a most recently recorded result;
   resetting the pointer to a location of the first recorded result upon completion of the algorithm, including resetting the pointer responsive to an operation code representing an instruction to reset the pointer and providing as a parameter of the instruction an identifier of the branch; and
   predicting subsequent results of the branch, in subsequent occurrences of the branch, in dependence upon the recorded results.

2. The method of claim 1 wherein recording each result of the branch further comprises:
   recording each result of the branch responsive to an operation code indicating that the branch is recordable.

3. The method of claim 1 wherein predicting subsequent results of the branch further comprises:
   incrementing the pointer on each occurrence of the branch; and
   using, for branch prediction on each occurrence of the branch, the recorded result identified by a current value of the pointer.

4. The method of claim 1 further comprising:
   determining for each prediction whether the prediction was correct; and
   recording, for each incorrect prediction, the result of the branch.

5. The method of claim 1 wherein the method is implemented on a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers.

6. An apparatus for branch prediction in a computer processor, the apparatus comprising a computer processor, a computer memory operatively coupled to the computer processor, the computer processor configured to be capable of:
  recording for a sequence of occurrences of a branch, in an algorithm in which the branch occurs more than once, each result of the branch, including maintaining a pointer to a location of a most recently recorded result;
  resetting the pointer to a location of the first recorded result upon completion of the algorithm, including resetting the pointer responsive to an operation code representing an instruction to reset the pointer and providing as a parameter of the instruction an identifier of the branch; and
  predicting subsequent results of the branch, in subsequent occurrences of the branch, in dependence upon the recorded results.

7. The apparatus of claim 6 wherein recording each result of the branch further comprises:
  recording each result of the branch responsive to an operation code indicating that the branch is recordable.

8. The apparatus of claim 6 wherein predicting subsequent results of the branch further comprises:
  incrementing the pointer on each occurrence of the branch; and
  using, for branch prediction on each occurrence of the branch, the recorded result identified by a current value of the pointer.

9. The apparatus of claim 6 wherein the computer processor is further configured to be capable of:
  determining for each prediction whether the prediction was correct; and
  recording, for each incorrect prediction, the result of the branch.

10. The apparatus of claim 6 wherein the apparatus is implemented on a network on chip ('NOC'), the NOC comprising integrated processor (IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers.

11. A computer program product for branch prediction in a computer processor, the computer program product comprising a computer readable, recordable medium, the computer program product further comprising computer program instructions capable of:
  recording for a sequence of occurrences of a branch, in an algorithm in which the branch occurs more than once, each result of the branch, including maintaining a pointer to a location of a most recently recorded result;
  resetting the pointer to a location of the first recorded result upon completion of the algorithm, including resetting the pointer responsive to an operation code representing an instruction to reset the pointer and providing as a parameter of the instruction an identifier of the branch; and
  predicting subsequent results of the branch, in subsequent occurrences of the branch, in dependence upon the recorded results.

12. The computer program product of claim 11 wherein recording each result of the branch further comprises:
  recording each result of the branch responsive to an operation code indicating that the branch is recordable.

13. The computer program product of claim 11 wherein predicting subsequent results of the branch further comprises:
  incrementing the pointer on each occurrence of the branch; and
  using, for branch prediction on each occurrence of the branch, the recorded result identified by a current value of the pointer.

14. The computer program product of claim 11 further comprising computer program instructions capable of:
  determining for each prediction whether the prediction was correct; and
  recording, for each incorrect prediction, the result of the branch.

15. The computer program product of claim 11 wherein the computer program instructions are capable of execution upon a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers.

\* \* \* \* \*